(12) United States Patent
Hsu

(10) Patent No.: US 10,683,972 B1
(45) Date of Patent: Jun. 16, 2020

(54) HAND HELD SOUND LAMP SIMULATING REAL FLAME

(71) Applicant: Dong Guan Jia Sheng Lighting Technology Co., Ltd. China, Dong-Guna, Guang-Dong (CN)

(72) Inventor: Kevin Hsu, Taichung (TW)

(73) Assignee: Dong Guan Jia Sheng Lighting Technology Co., Ltd. China, Guang-Dong (CN)

( * ) Notice: Subject to any disclaimer, the term of this patent is extended or adjusted under 35 U.S.C. 154(b) by 0 days.

(21) Appl. No.: 16/515,089

(22) Filed: Jul. 18, 2019

(51) Int. Cl.
| | | |
|---|---|---|
| F21V 21/00 | (2006.01) | |
| F21L 4/02 | (2006.01) | |
| F21V 23/00 | (2015.01) | |
| F21V 33/00 | (2006.01) | |
| F21V 21/40 | (2006.01) | |
| H04R 1/02 | (2006.01) | |
| H04R 1/34 | (2006.01) | |
| F21V 1/00 | (2006.01) | |
| H05B 45/10 | (2020.01) | |
| H05B 47/16 | (2020.01) | |
| F21Y 115/10 | (2016.01) | |

(52) U.S. Cl.
CPC ............... *F21L 4/02* (2013.01); *F21V 1/00* (2013.01); *F21V 21/406* (2013.01); *F21V 23/003* (2013.01); *F21V 33/0056* (2013.01); *H04R 1/028* (2013.01); *H04R 1/345* (2013.01); *H05B 45/10* (2020.01); *H05B 47/16* (2020.01); *F21Y 2115/10* (2016.08)

(58) Field of Classification Search
CPC .. F21L 4/02; F21V 1/00; F21V 21/406; F21V 23/003; F21V 33/0056; H05B 47/16; H05B 45/10; H04R 1/026; H04R 1/345; F21Y 2115/10
USPC ........................................................ 362/235
See application file for complete search history.

(56) References Cited

U.S. PATENT DOCUMENTS

| | | | | |
|---|---|---|---|---|
| 5,463,280 A | * | 10/1995 | Johnson ................. | H05B 45/00 315/187 |
| 5,726,535 A | * | 3/1998 | Yan ......................... | F21V 3/061 315/185 R |
| 7,883,242 B2 | * | 2/2011 | Ng .......................... | H05B 45/00 362/249.06 |
| 2003/0072154 A1 | * | 4/2003 | Moore .................... | H05B 45/10 362/234 |
| 2004/0223326 A1 | * | 11/2004 | Wainwright ............ | F21S 6/001 362/231 |

(Continued)

*Primary Examiner* — Laura K Tso
(74) *Attorney, Agent, or Firm* — Alan D. Kamrath; Mayer & Williams PC

(57) ABSTRACT

A sound lamp includes an illuminating device including a circuit board, a single-piece controller, and sixteen light emitting members. The single-piece controller has sixteen legs. Each of the light emitting members has a first end and a second end. The first ends of the light emitting members are connected in parallel. The second end of each of the light emitting members is electrically connected with one of the legs of the single-piece controller. The single-piece controller controls lighting sequences of the light emitting members. Thus, the single-piece controller controls the light emitting members, such that the light emitting members are brightened gradually and dimmed gradually at different cycles, so as to simulate a real flame of an oil kettle.

7 Claims, 4 Drawing Sheets

(56) References Cited

U.S. PATENT DOCUMENTS

| | | | |
|---|---|---|---|
| 2006/0208666 A1* | 9/2006 | Johnson | H05B 45/37 |
| | | | 315/294 |
| 2008/0094857 A1* | 4/2008 | Smith | F21K 9/232 |
| | | | 362/649 |
| 2016/0128157 A1* | 5/2016 | Ulivella | H05B 45/20 |
| | | | 315/294 |
| 2016/0327227 A1* | 11/2016 | Green, Jr. | F21S 10/043 |
| 2018/0320848 A1* | 11/2018 | Wei | H05B 45/10 |

* cited by examiner

FIG. 4

HAND HELD SOUND LAMP SIMULATING REAL FLAME

BACKGROUND OF THE INVENTION

1. Field of the Invention

The present invention relates to a lamp and, more particularly, to a lamp having the shape of an oil can (or kettle) and contains a sound (or an acoustics) device therein.

2. Description of the Related Art

An LED lamp may be used to simulate the appearance of a real flame, so as to provide amusement and ornamental effects. Thus, the LED lamp provides a beautiful view and saves the energy. However, the visible effect produced by the conventional LED lamp is not realistic enough, and cannot satisfy the user's requirement.

BRIEF SUMMARY OF THE INVENTION

The primary objective of the present invention is to provide a hand held sound lamp that is adapted to simulate a real flame.

In accordance with the present invention, there is provided a sound lamp comprising an illuminating device including a circuit board, a single-piece controller, and sixteen light emitting members. The single-piece controller has sixteen legs. Each of the light emitting members has a first end and a second end. The first ends of the light emitting members are connected in parallel. The second end of each of the light emitting members is electrically connected with one of the legs of the single-piece controller. The single-piece controller controls lighting sequences of the light emitting members.

Thus, the single-piece controller controls the light emitting members, such that the light emitting members are brightened gradually and dimmed gradually at different cycles and different lagging time, so as to simulate a burning effect or a real flame of an oil kettle, thereby greatly enhancing the decorative function of the sound lamp.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 4 is a circuit diagram of multiple light emitting members of a controller of an illuminating device of the sound lamp in accordance with the preferred embodiment of the present invention.

DETAILED DESCRIPTION OF THE INVENTION

Figure 1:
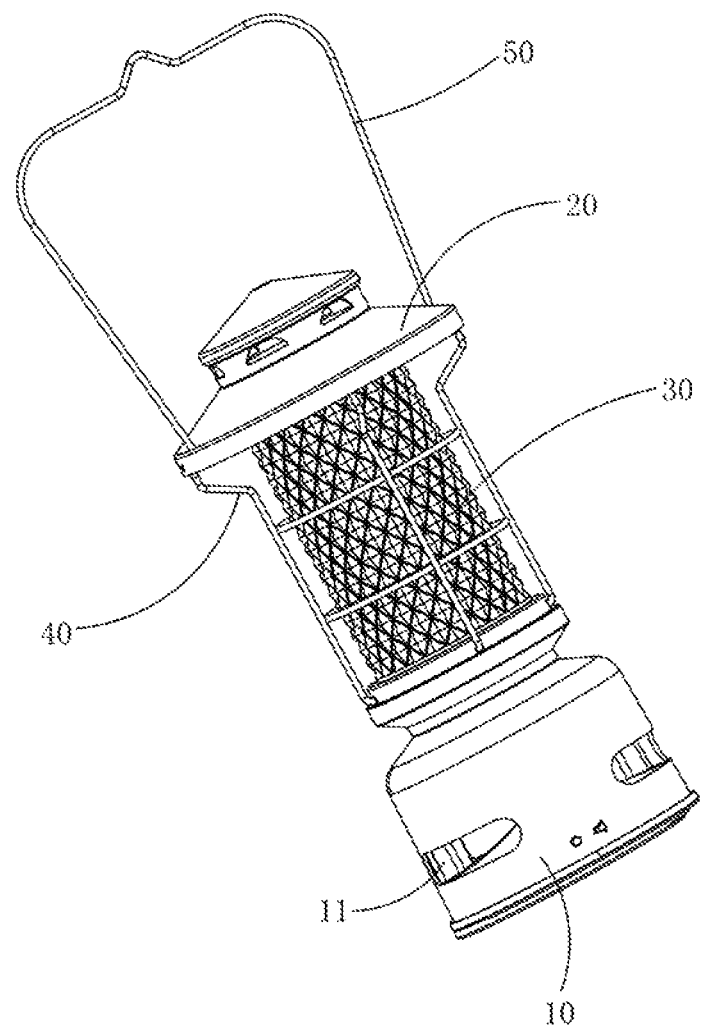
FIG. 1 is a perspective view of a sound lamp in accordance with the preferred embodiment of the present invention.
Figure 2:
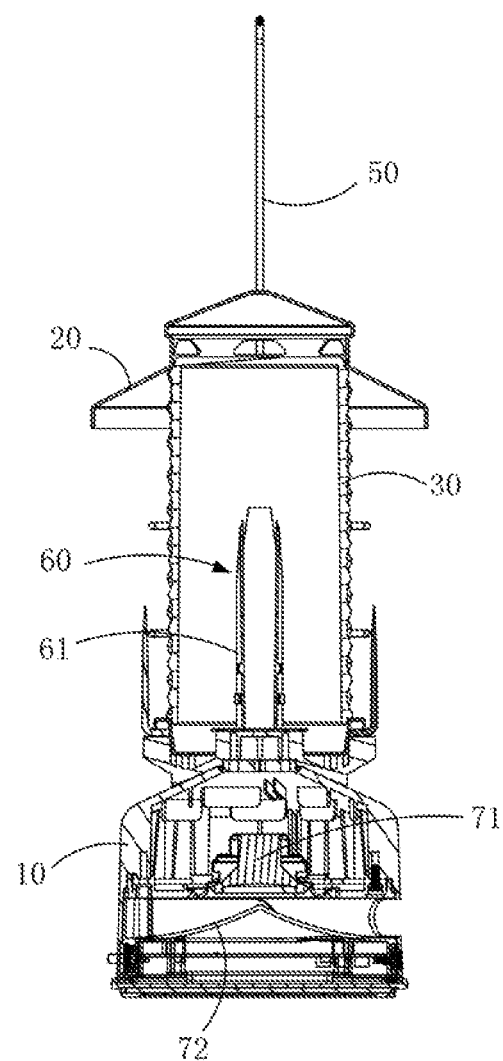
FIG. 2 is a cross-sectional view of the sound lamp as shown in FIG. 1.
Figure 3:
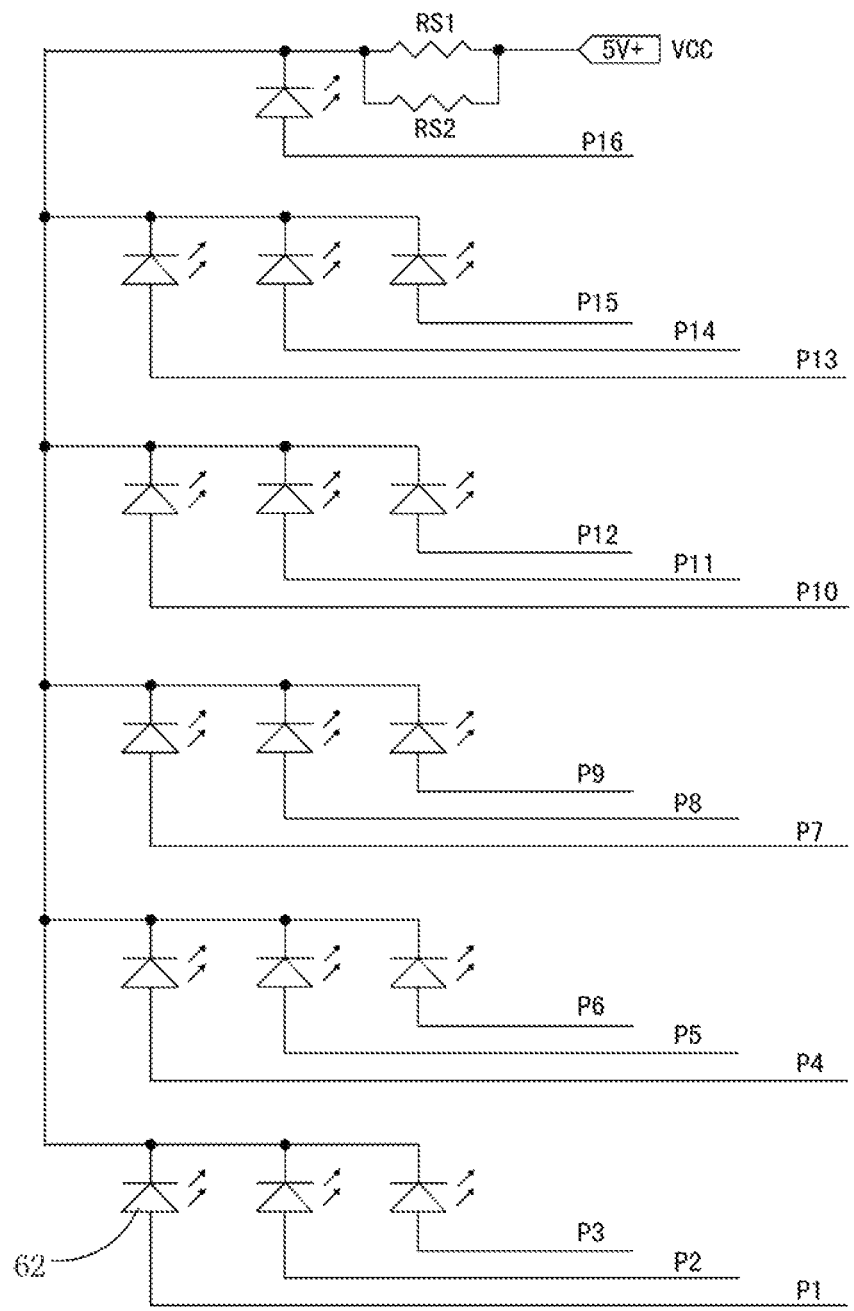
FIG. 3 is a circuit diagram of multiple light emitting members of the sound lamp in accordance with the preferred embodiment of the present invention.
Figure 4:
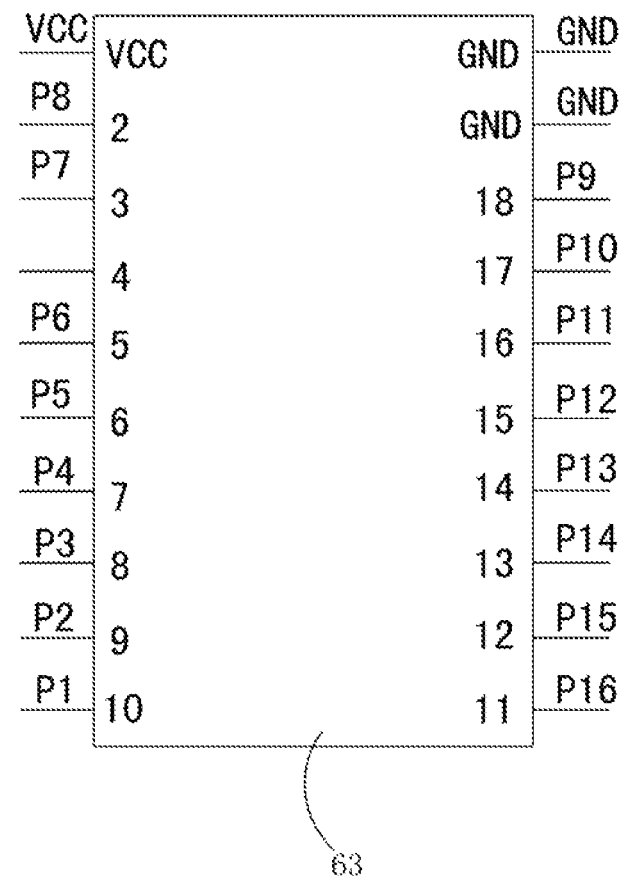

Referring to FIGS. 1-4, a sound lamp in accordance with the preferred embodiment of the present invention comprises a base 10, an outer shade 30 mounted on the base 10, a top cover 20 mounted on the outer shade 30, a sound module (or acoustics device) mounted in the base 10, an illuminating device 60 mounted on the base 10 and located in the outer shade 30, a plurality of connecting bars 40 connecting the outer shade 30 and the top cover 20, and a handle 50 mounted on the top cover 20. The outer shade 30 is located between the base 10 and the top cover 20.

In the preferred embodiment of the present invention, the sound module includes a speaker (or horn) 71 and a voice diffuser (or transmitter) 72. The speaker 71 is directed toward the voice diffuser 72. The voice diffuser 72 has a conical shape and has a diameter increased gradually. The base 10 is provided with at least one voice output hole aligning with the voice diffuser 72. The outer shade 30 has an outer face provided with a plurality of bosses (or projections) that are arranged regularly. Each of the bosses of the outer shade 30 has a pyramid arrangement.

In the preferred embodiment of the present invention, the illuminating device 60 includes a circuit board 61, a single-piece controller 63, at least one battery, and sixteen light emitting members 62. The single-piece controller 63 has sixteen legs. Preferably, each of the light emitting members 62 is an LED. The light emitting members 62 are connected in parallel. Each of the light emitting members 62 has a first end electrically connected with the at least one battery and a second end electrically connected with one of the legs of the single-piece controller 63. The single-piece controller 63 controls lighting sequences of the light emitting members 62.

In practice, the single-piece controller 63 has a first mode (P1) which turns on a first one of the light emitting members 62. In the first mode (P1), the first one of the light emitting members 62 brightens gradually and lasts for 500 ms, and then dims gradually and lasts for 500 ms. The first mode (P1) is repeated successively with a time interval of 8 ms.

The single-piece controller 63 has a second mode (P2) which turns on a second one of the light emitting members 62 and delays (or lags) 70 ms later than the first mode (P1). In the second mode (P2), the second one of the light emitting members 62 brightens gradually and lasts for 500 ms, and then dims gradually and lasts for 500 ms. The second mode (P2) is repeated successively.

The single-piece controller 63 has a third mode (P3) which turns on a third one of the light emitting members 62 and delays 50 ms later than the second mode (P2). In the third mode (P3), the third one of the light emitting members 62 brightens gradually and lasts for 500 ms, and then dims gradually and lasts for 500 ms. The third mode (P3) is repeated successively. The single-piece controller 63 has a fourth mode (P4) which turns on a fourth one of the light emitting members 62 and lasts for 210 ms, then turns off the fourth one of the light emitting members 62 and lasts for 5 ms, then turns on the fourth one of the light emitting members 62 and lasts for 12 ms, and then turns off the fourth one of the light emitting members 62 and lasts for 15 ms. The fourth mode (P4) is repeated successively.

The single-piece controller 63 has a fifth mode (P5) which turns on a fifth one of the light emitting members 62 and lasts for 440 ms, then turns off the fifth one of the light emitting members 62 and lasts for 5 ms, then turns on the fifth one of the light emitting members 62 and lasts for 20 ms, and then turns off the fifth one of the light emitting members 62 and lasts for 12 ms. The fifth mode (P5) is repeated successively.

The single-piece controller 63 has a sixth mode (P6) which turns on a sixth one of the light emitting members 62 and lasts for 180 ms, then turns off the sixth one of the light emitting members 62 and lasts for 5 ms, then turns on the sixth one of the light emitting members 62 and lasts for 13 ms, and then turns off the sixth one of the light emitting members 62 and lasts for 6 ms. The sixth mode (P6) is repeated successively.

The single-piece controller 63 has a seventh mode (P7) which turns on a seventh one of the light emitting members 62 and lasts for 100 ms, and then turns off the seventh one of the light emitting members 62 and lasts for 100 ms. The seventh mode (P7) is repeated successively.

The single-piece controller 63 has an eighth mode (P8) which turns on an eighth one of the light emitting members 62 and lasts for 80 ms, then turns off the eighth one of the light emitting members 62 and lasts for 70 ms, and then turns on the eighth one of the light emitting members 62 and lasts for 105 ms. The eighth mode (P8) is repeated successively.

The single-piece controller 63 has a ninth mode (P9) which turns on a ninth one of the light emitting members 62 and lasts for 50 ms, and then turns off the ninth one of the light emitting members 62 and lasts for 50 ms. The ninth mode (P9) is repeated successively.

The single-piece controller 63 has a tenth mode (P10) which turns on a tenth one of the light emitting members 62 and lasts for 100 ms, and then turns off the tenth one of the light emitting members 62 and lasts for 750 ms. The tenth mode (P10) then turns on the tenth one of the light emitting members 62 and lasts for 100 ms, and then turns off the tenth one of the light emitting members 62 and lasts for 100 ms, and the aforesaid procedure is repeated five times. The tenth mode (P10) then turns off the tenth one of the light emitting members 62 and lasts for 750 ms. The tenth mode (P10) is repeated successively.

The single-piece controller 63 has an eleventh mode (P11) which turns on an eleventh one of the light emitting members 62 and lasts for 85 ms, and then turns off the eleventh one of the light emitting members 62 and lasts for 110 ms. The eleventh mode (P11) then turns on the eleventh one of the light emitting members 62 and lasts for 95 ms, and then turns off the eleventh one of the light emitting members 62 and lasts for 95 ms, and the aforesaid procedure is repeated three times. The eleventh mode (P11) then turns off the eleventh one of the light emitting members 62 and lasts for 85 ms. The eleventh mode (P11) is repeated successively.

The single-piece controller 63 has a twelfth mode (P12) which turns on a twelfth one of the light emitting members 62 and lasts for 85 ms, then turns off the twelfth one of the light emitting members 62 and lasts for 85 ms, then turns on the twelfth one of the light emitting members 62 and lasts for 85 ms, and then turns off the twelfth one of the light emitting members 62 and lasts for 1000 ms. The twelfth mode (P12) then turns on the twelfth one of the light emitting members 62 and lasts for 85 ms, and then turns off the twelfth one of the light emitting members 62 and lasts for 85 ms, and the aforesaid procedure is repeated three times. The twelfth mode (P12) then turns off the twelfth one of the light emitting members 62 and lasts for 940 ms. The twelfth mode (P12) is repeated successively.

The single-piece controller 63 has a thirteenth mode (P13) which turns on a thirteenth one of the light emitting members 62 and lasts for 70 ms, then turns off the thirteenth one of the light emitting members 62 and lasts for 1500 ms, then turns on the thirteenth one of the light emitting members 62 and lasts for 70 ms, then turns off the thirteenth one of the light emitting members 62 and lasts for 700 ms, then turns on the thirteenth one of the light emitting members 62 and lasts for 70 ms, and then turns off the thirteenth one of the light emitting members 62 and lasts for 2500 ms. The thirteenth mode (P13) is repeated successively.

The single-piece controller 63 has a fourteenth mode (P14) which turns on a fourteenth one of the light emitting members 62 and lasts for 120 ms, and then turns off the fourteenth one of the light emitting members 62 and lasts for 200 ms, and the aforesaid procedure is repeated three times. The fourteenth mode (P14) then turns off the fourteenth one of the light emitting members 62 and lasts for 1600 ms. The fourteenth mode (P14) is repeated successively.

The single-piece controller 63 has a fifteenth mode (P15) which turns on a fifteenth one of the light emitting members 62 and lasts for 150 ms, then turns off the fifteenth one of the light emitting members 62 and lasts for 1200 ms, then turns on the fifteenth one of the light emitting members 62 and lasts for 100 ms, then turns off the fifteenth one of the light emitting members 62 and lasts for 1000 ms, then turns on the fifteenth one of the light emitting members 62 and lasts for 150 ms, and then turns off the fifteenth one of the light emitting members 62 and lasts for 1500 ms. The fifteenth mode (P15) is repeated successively.

The single-piece controller 63 has a sixteen mode (P16) which turns on a sixteen one of the light emitting members 62 and lasts for 50 ms, then turns off the sixteen one of the light emitting members 62 and lasts for 300 ms, then turns on the sixteen one of the light emitting members 62 and lasts for 50 ms, then turns off the sixteen one of the light emitting members 62 and lasts for 850 ms, then turns on the sixteen one of the light emitting members 62 and lasts for 30 ms, then turns off the sixteen one of the light emitting members 62 and lasts for 500 ms, then turns on the sixteen one of the light emitting members 62 and lasts for 30 ms, and then turns off the sixteen one of the light emitting members 62 and lasts for 1500 ms. The sixteen mode (P16) is repeated successively.

Accordingly, the single-piece controller 63 controls the lighting sequences of the light emitting members 62, such that the light emitting members 62 are brightened gradually and dimmed gradually at different cycles and different lagging time, so as to simulate a burning effect or a real flame of an oil kettle, thereby greatly enhancing the decorative function of the sound lamp. In addition, the sound lamp provides a visible effect of a kerosene light, thereby enhancing the aesthetic quality thereof.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A sound lamp comprising:
an illuminating device including a circuit board, a single-piece controller, and sixteen light emitting members;
wherein:
the single-piece controller has sixteen legs;
each of the light emitting members has a first end and a second end;
the first ends of the light emitting members are connected in parallel;
the second end of each of the light emitting members is electrically connected with one of the legs of the single-piece controller;
the single-piece controller controls lighting sequences of the light emitting members;

the single-piece controller has a first mode which turns on a first one of the light emitting members;

in the first mode, the first one of the light emitting members brightens gradually and lasts for 500 ms, and then dims gradually and lasts for 500 ms;

the first mode is repeated successively with a time interval of 8 ms;

the single-piece controller has a second mode which turns on a second one of the light emitting members and delays 70 ms later than the first mode;

in the second mode, the second one of the light emitting members brightens gradually and lasts for 500 ms, and then dims gradually and lasts for 500 ms;

the second mode is repeated successively;

the single-piece controller has a third mode which turns on a third one of the light emitting members and delays 50 ms later than the second mode;

in the third mode, the third one of the light emitting members brightens gradually and lasts for 500 ms, and then dims gradually and lasts for 500 ms;

the third mode is repeated successively;

the single-piece controller has a fourth mode which turns on a fourth one of the light emitting members and lasts for 210 ms, then turns off the fourth one of the light emitting members and lasts for 5 ms, then turns on the fourth one of the light emitting members and lasts for 12 ms, and then turns off the fourth one of the light emitting members and lasts for 15 ms;

the fourth mode is repeated successively;

the single-piece controller has a fifth mode which turns on a fifth one of the light emitting members and lasts for 440 ms, then turns off the fifth one of the light emitting members and lasts for 5 ms, then turns on the fifth one of the light emitting members and lasts for 20 ms, and then turns off the fifth one of the light emitting members and lasts for 12 ms;

the fifth mode is repeated successively;

the single-piece controller has a sixth mode which turns on a sixth one of the light emitting members and lasts for 180 ms, then turns off the sixth one of the light emitting members and lasts for 5 ms, then turns on the sixth one of the light emitting members and lasts for 13 ms, and then turns off the sixth one of the light emitting members and lasts for 6 ms;

the sixth mode is repeated successively;

the single-piece controller has a seventh mode which turns on a seventh one of the light emitting members and lasts for 100 ms, and then turns off the seventh one of the light emitting members and lasts for 100 ms;

the seventh mode is repeated successively;

the single-piece controller has an eighth mode which turns on an eighth one of the light emitting members and lasts for 80 ms, then turns off the eighth one of the light emitting members and lasts for 70 ms, and then turns on the eighth one of the light emitting members and lasts for 105 ms;

the eighth mode is repeated successively;

the single-piece controller has a ninth mode which turns on a ninth one of the light emitting members and lasts for 50 ms, and then turns off the ninth one of the light emitting members and lasts for 50 ms;

the ninth mode is repeated successively;

the single-piece controller has a tenth mode which turns on a tenth one of the light emitting members and lasts for 100 ms, and then turns off the tenth one of the light emitting members and lasts for 750 ms;

the tenth mode then turns on the tenth one of the light emitting members and lasts for 100 ms, and then turns off the tenth one of the light emitting members and lasts for 100 ms, and the aforesaid procedure is repeated five times;

the tenth mode then turns off the tenth one of the light emitting members and lasts for 750 ms;

the tenth mode is repeated successively;

the single-piece controller has an eleventh mode which turns on an eleventh one of the light emitting members and lasts for 85 ms, and then turns off the eleventh one of the light emitting members and lasts for 110 ms;

the eleventh mode then turns on the eleventh one of the light emitting members and lasts for 95 ms, and then turns off the eleventh one of the light emitting members and lasts for 95 ms, and the aforesaid procedure is repeated three times;

the eleventh mode then turns off the eleventh one of the light emitting members and lasts for 85 ms;

the eleventh mode is repeated successively;

the single-piece controller has a twelfth mode which turns on a twelfth one of the light emitting members and lasts for 85 ms, then turns off the twelfth one of the light emitting members and lasts for 85 ms, then turns on the twelfth one of the light emitting members and lasts for 85 ms, and then turns off the twelfth one of the light emitting members and lasts for 1000 ms;

the twelfth mode then turns on the twelfth one of the light emitting members and lasts for 85 ms, and then turns off the twelfth one of the light emitting members and lasts for 85 ms, and the aforesaid procedure is repeated three times;

the twelfth mode then turns off the twelfth one of the light emitting members and lasts for 940 ms;

the twelfth mode is repeated successively;

the single-piece controller has a thirteenth mode which turns on a thirteenth one of the light emitting members and lasts for 70 ms, then turns off the thirteenth one of the light emitting members and lasts for 1500 ms, then turns on the thirteenth one of the light emitting members and lasts for 70 ms, then turns off the thirteenth one of the light emitting members and lasts for 700 ms, then turns on the thirteenth one of the light emitting members and lasts for 70 ms, and then turns off the thirteenth one of the light emitting members and lasts for 2500 ms;

the thirteenth mode is repeated successively;

the single-piece controller has a fourteenth mode which turns on a fourteenth one of the light emitting members and lasts for 120 ms, and then turns off the fourteenth one of the light emitting members and lasts for 200 ms, and the aforesaid procedure is repeated three times;

the fourteenth mode then turns off the fourteenth one of the light emitting members and lasts for 1600 ms;

the fourteenth mode is repeated successively;

the single-piece controller has a fifteenth mode which turns on a fifteenth one of the light emitting members and lasts for 150 ms, then turns off the fifteenth one of the light emitting members and lasts for 1200 ms, then turns on the fifteenth one of the light emitting members and lasts for 100 ms, then turns off the fifteenth one of the light emitting members and lasts for 1000 ms, then turns on the fifteenth one of the light emitting members and lasts for 150 ms, and then turns off the fifteenth one of the light emitting members and lasts for 1500 ms;

the fifteenth mode is repeated successively;

the single-piece controller has a sixteen mode which turns on a sixteen one of the light emitting members and lasts for 50 ms, then turns off the sixteen one of the light emitting members and lasts for 300 ms, then turns on the sixteen one of the light emitting members and lasts for 50 ms, then turns off the sixteen one of the light emitting members and lasts for 850 ms, then turns on the sixteen one of the light emitting members and lasts for 30 ms, then turns off the sixteen one of the light emitting members and lasts for 500 ms, then turns on the sixteen one of the light emitting members and lasts for 30 ms, and then turns off the sixteen one of the light emitting members and lasts for 1500 ms; and the sixteen mode is repeated successively.

2. The sound lamp of claim 1, further comprising:

a base, an outer shade mounted on the base, a top cover mounted on the outer shade and a sound module mounted in the base;

wherein:

the illuminating device is mounted on the base and located in the outer shade; and the outer shade is located between the base and the top cover.

3. The sound lamp of claim 2, wherein:

the sound module includes a speaker and a voice diffuser;

the speaker is directed toward the voice diffuser; and the voice diffuser has a conical shape and has a diameter increased gradually.

4. The sound lamp of claim 3, wherein the base is provided with at least one voice output hole aligning with the voice diffuser.

5. The sound lamp of claim 2, wherein the outer shade has an outer face provided with a plurality of bosses that are arranged regularly, and each of the bosses of the outer shade has a pyramid arrangement.

6. The sound lamp of claim 2, further comprising:

a plurality of connecting bars connecting the outer shade and the top cover.

7. The sound lamp of claim 2, further comprising:

a handle mounted on the top cover.

\* \* \* \* \*